United States Patent [19]
LaFleur et al.

[11] Patent Number: 5,152,554
[45] Date of Patent: Oct. 6, 1992

[54] COUPLING APPARATUS

[75] Inventors: Karl K. LaFleur; Donald R. Wade, both of Weatherford, Tex.

[73] Assignee: LaFleur Petroleum Services, Inc., Weatherford, Tex.

[21] Appl. No.: 629,542

[22] Filed: Dec. 18, 1990

[51] Int. Cl.⁵ .............................. F16L 37/00
[52] U.S. Cl. ........................ 285/88; 285/23; 285/34; 285/353; 285/386; 285/315; 285/348; 285/110
[58] Field of Search ............ 285/23, 34, 35, 353, 285/386, 314, 315, 369, 88, 348, 110, 111, 351

[56] References Cited

U.S. PATENT DOCUMENTS

| | | |
|---|---|---|
| 1,016,620 | 2/1912 | Gapp . |
| 1,098,620 | 6/1914 | Gillar . |
| 1,662,311 | 3/1928 | Hamer . |
| 1,866,726 | 7/1932 | Santiago . |
| 2,223,388 | 12/1940 | Scaramucci . |
| 2,498,915 | 2/1950 | Espegren . |
| 2,535,694 | 12/1950 | Payne ........................ 285/354 X |
| 2,620,037 | 12/1952 | McClendon . |
| 3,071,188 | 1/1963 | Raulins . |
| 3,113,792 | 12/1963 | Brown . |
| 3,291,442 | 12/1966 | Cranage . |
| 3,361,453 | 1/1968 | Brown et al. ................ 285/321 |
| 3,545,542 | 12/1970 | Scott . |
| 3,616,850 | 11/1971 | Scott . |
| 3,650,549 | 3/1972 | Pepper ....................... 285/369 X |
| 3,863,716 | 2/1975 | Streich . |
| 3,915,226 | 10/1975 | Savage . |
| 3,963,268 | 6/1976 | Widdicombe ............... 285/364 X |
| 4,093,283 | 6/1978 | Weinhold . |
| 4,124,233 | 11/1978 | Ahlstone . |
| 4,138,145 | 2/1979 | Lawrence ................... 285/323 X |
| 4,146,254 | 3/1979 | Turner et al. ............... 285/105 |
| 4,209,193 | 6/1980 | Ahlstone . |
| 4,209,270 | 6/1980 | Billingsley . |
| 4,219,226 | 8/1980 | Kappenhagen . |
| 4,246,967 | 1/1981 | Harris . |
| 4,278,278 | 7/1981 | Chambless et al. . |
| 4,290,482 | 9/1981 | Brisco . |
| 4,433,859 | 2/1984 | Driver et al. . |
| 4,453,745 | 6/1984 | Nelson . |
| 4,519,633 | 5/1985 | Nichols . |
| 4,522,430 | 6/1985 | Stromberg . |
| 4,524,998 | 6/1985 | Brisco . |
| 4,541,490 | 9/1985 | Bigbie et al. . |
| 4,566,168 | 1/1986 | Stromberg . |
| 4,613,161 | 9/1986 | Brisco . |
| 4,624,483 | 11/1986 | Stromberg . |
| 4,751,968 | 6/1988 | Ames et al. . |
| 4,850,622 | 7/1989 | Suzuki ........................ 285/321 X |
| 4,895,396 | 1/1990 | Washizu ..................... 285/351 X |

FOREIGN PATENT DOCUMENTS 133678  3/1946  Australia ..................... 285/323

Primary Examiner—Andrew V. Kundrat
Attorney, Agent, or Firm—Haynes and Boone

[57] ABSTRACT

A coupling apparatus is provided for quick coupling of surface pumping equipment to a cylindrical member. The cylindrical member is engaged by dogs which are urged into locking position about the cylindrical member.

4 Claims, 2 Drawing Sheets

COUPLING APPARATUS

BACKGROUND OF THE INVENTION

1. Field of the Invention

The present invention relates to a coupling apparatus designed to be quickly connected to a cylindrical member, and more particularly to a coupling apparatus for quickly connecting surface pumping equipment to the casing, tubing or drill stem of an oil or gas well.

2. Description of the Prior Art

When casing is being run in connection with the drilling of an oil or gas well, it sometimes becomes necessary to connect surface pumping equipment to circulate drilling fluid down the well. Typically, this need arises when a tight spot is encountered and drilling fluid is circulated down the well to run the casing past the tight spot and avoid the need for removing the casing and redrilling the hole.

According to the prior art, surface pumping equipment is attached by engaging a swadge having a threaded male lower end with the threaded collar of the casing. Many problems are encountered, however, when engaging the swadge and the casing collar. For instance, the top of the casing typically stands as much as fifteen to forty feet above the floor of the drilling rig creating a hazard to personnel who must work at that height to engage the swadge with the casing collar. In addition, the swadges are quite susceptible to cross-threading when engaged to the casing collar sometimes leading to blowouts under high pressure conditions. Finally, engaging the swadge to the casing collar is a time consuming operation.

SUMMARY OF THE INVENTION

The coupling apparatus of the present invention overcomes the above-mentioned drawbacks and disadvantages which are characteristic of the prior art.

The coupling apparatus of the present invention comprises a body member having a cylindrical bore with a first cap means engaged with the body member at a first end thereof and a second cap means engaged with the body member at a second end thereof. A first annular sealing means and a second annular sealing means are disposed within the bore of the body with the second annular sealing means engaged with the first annular sealing means. A plurality of locking means are slidingly engaged with the body member and register with the first cap means.

In a preferred embodiment, the coupling apparatus of the present invention comprises a body having a cylindrical bore. The upper end of a cylindrical member may be closely received within the bore of the body. A first annular sealing means and a second annular sealing means are disposed within the bore of the body. The first annular sealing means may be hydraulically biased against the cylindrical member and the second annular sealing means may be mechanically and hydraulically biased against the cylindrical member and the cylindrical bore of the body. A first cap member having an internally threaded portion is threadedly engaged with a threaded outer surface at a first end of the body. The first cap member includes an inward protruding annular leg having a beveled surface. A plurality of locking means are slidingly engaged within a plurality of slots disposed within a radially outer ring at the first end of the body. The locking means have a beveled surface that registers with the beveled surface of the annular leg of the first cap member. When the first cap member is rotated in a manner to move the first cap member toward a second end of the body opposite the first end of the body, the beveled surface of the annular leg of the body contacts the beveled surface of the locking means, urging the locking means inward toward the cylindrical member so that the locking means register with the cylindrical member to prevent the coupling apparatus from disengaging from the cylindrical member. The coupling apparatus also includes a second cap member having an internally threaded portion which is threadedly engaged with a threaded outer surface at the second end of the body.

Thus, by disposing the coupling apparatus around the cylindrical member, rotating the first cap member until the locking means contact the cylindrical member, and pumping a desired fluid through the apparatus which urges the first and second annular sealing means into their respective sealing positions, the coupling apparatus of the present invention allows the circulation through the cylindrical member of the desired fluid without the possibility of a thread leak or failure.

Numerous objects, features and advantages of the present invention will be readily apparent to those skilled in the art upon a reading of the following disclosure when taken in conjunction with the accompanying drawings.

DESCRIPTION OF THE PREFERRED EMBODIMENTS

Figure 1:
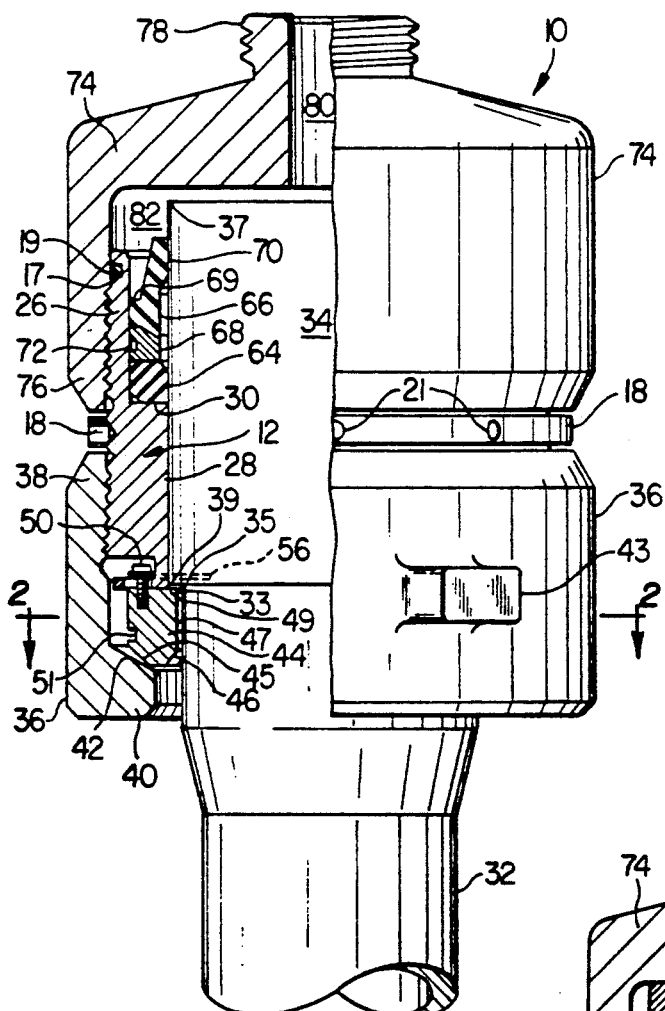
FIG. 1 is a perspective view of a coupling apparatus according to the present invention.

Referring now to the drawings, and particularly to FIG. 1, the coupling apparatus of the present invention is shown and generally designated by the numeral 10.

The coupling apparatus 10 may be coupled to any cylindrical member such as the casing, tubing or drill stem of an oil or gas well or any other type of piping or tubular goods. For purposes of description herein all such cylindrical members shall be referred to as tubing. The coupling apparatus 10 may be coupled, preferably, to tubing having a terminal collar.

Figure 3:
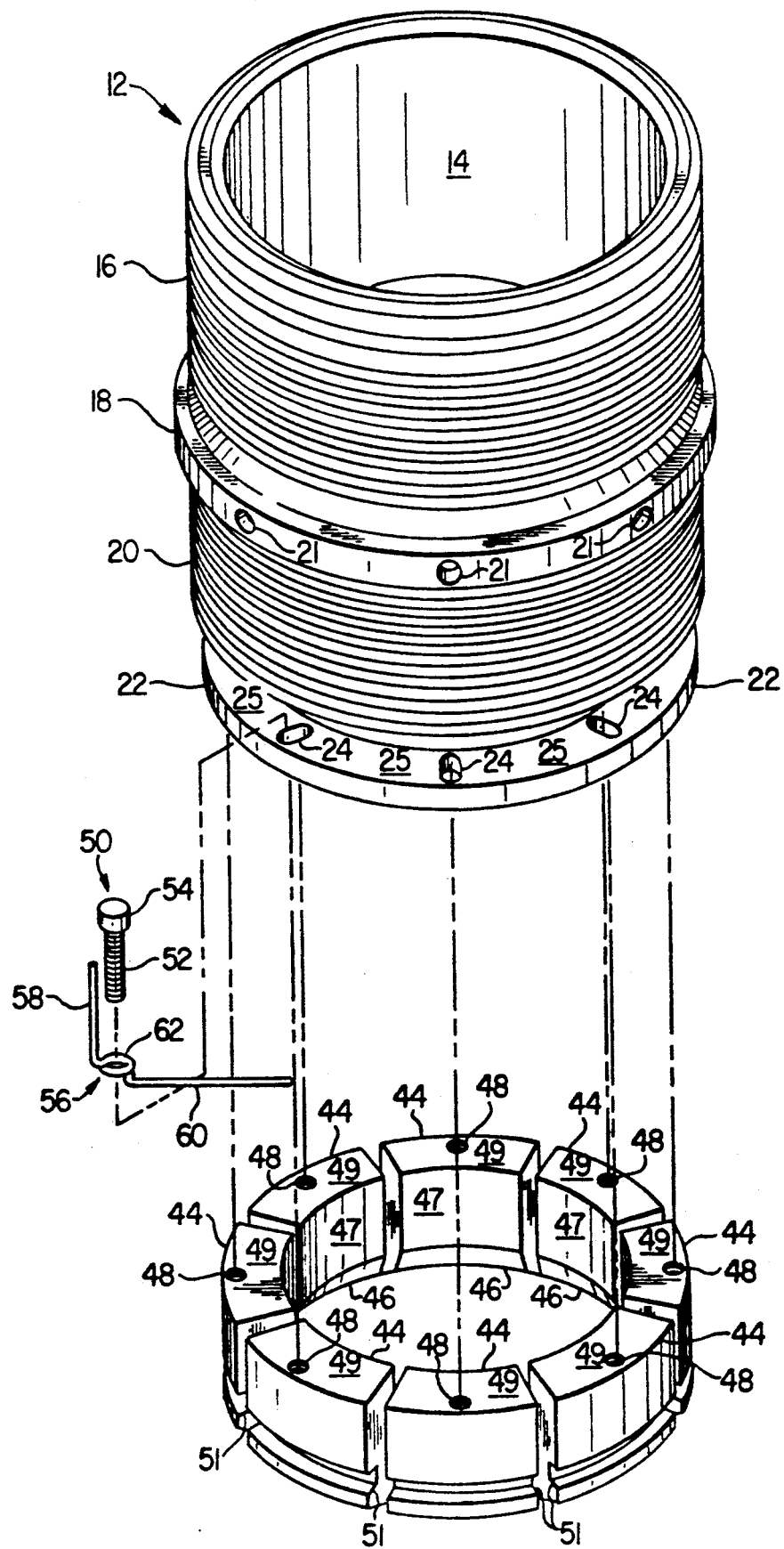
FIG. 3 is a partial exploded view of a coupling apparatus according to the present invention.

As shown in FIG. 3, the coupling apparatus 10 includes a body 12 having a cylindrical bore 14, a radially outer upper threaded surface 16, a radially outer intermediate surface 18, a radially outer lower threaded surface 20 and a radially outer ring 22. As shown in FIG. 1, the radially outer upper threaded surface includes an annular groove 17 in which an O-ring 19 is preferably disposed. The radially outer intermediate surface 18 includes a plurality of circumferentially spaced bores 21 in which various tools may be engaged to aid in the handling of coupling apparatus 10. The radially outer ring 22 has a plurality of slots 24 and an upper surface 25.

As shown in FIG. 1, the inner surface of body 12 defining the cylindrical bore 14 includes an upper portion 26 and a lower portion 28 divided by an inward protruding annular step 30.

As shown in FIG. 1, the coupling apparatus 10 may be disposed about tubing 32 having a radially outer surface 33, and a terminal collar 34. The collar 34 has a shoulder 35, an upper corner 37 and a lower corner 39. The lower portion 28 of the cylindrical bore 14 of body 12 has an inner diameter that is approximately equal to the outer diameter of collar 34 so that the collar 34 is closely received with the lower portion 28 of the cylindrical bore 14 of body 12.

A bottom cap 36 having an internally threaded upper portion 38 is threadedly engaged with the radially outer lower threaded surface 20 of body 12. The bottom cap 36 has an inward protruding annular leg 40 having a beveled surface 42. In addition, the bottom cap 36 may include one or more handles 43 to aid in the handling of the coupling apparatus 10.

Figure 5:
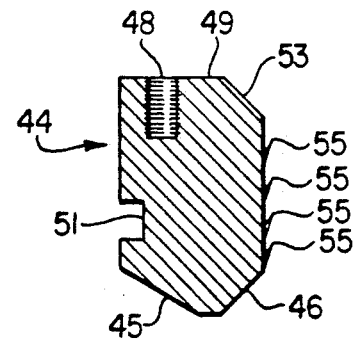
FIG. 5 is a detail view of a component of the coupling apparatus of FIG. 1.

A plurality of dogs 44 having a first beveled surface 45, a second beveled surface 46, an inner surface 47, a threaded bore 48 and an upper surface 49 are disposed between the radially outer ring 22 of body 12 and the inward protruding annular leg 40 of bottom cap 36. As shown in FIGS. 3 and 5, each dog 44 may also include a groove 51 to accommodate an O-ring (not shown). Also, as shown in FIG. 5, each dog may include a third beveled surface 53 and a plurality of teeth 55.

As shown in FIG. 3, a screw 50 having a threaded portion 52 and a head portion 54 is threadedly engaged within the threaded bore 48 of each dog 44. Each screw 50 is slidingly engaged within a corresponding slot 24 disposed within the radially outer ring 22 of body 12. The outer diameter of the threaded portion 52 is slightly less than the width of the slots 24 while the outer diameter of the head portion 54 is greater than the width of slots 24.

A dog release spring 56 rests upon and is supported by the upper surface 25 of radially outer ring 22. As shown in FIG. 3, each dog release spring 56 includes a first leg portion 58 and a second leg portion 60 which bear against the radially outer lower threaded surface 20 of body 12. The dog release springs 56 are configured to include a bore 62 through which the threaded portion 52 of each screw 50 may pass. The dog release springs 56 thus urge each screw 50 and dog 44 radially outward in relation to the cylindrical bore 14 of the body 12.

A first annular sealing means 64 rests upon the inward protruding annular step 30 of body 12. A second annular sealing means 66 rests upon the first annular sealing means 64. The first annular sealing means 64 has a multi-sided cross-section, preferably ranging from octagonal to circular. The second annular sealing means 66 has a lower portion 68 resting upon the first annular sealing means 64, an outward protruding annular leg 69 and an upper portion 70. The lower portion 68 of the second annular sealing means 66 includes an annular groove 72. An O-ring (not shown) is preferably disposed in the annular groove 72. Preferably, the lower portion 68 is rigid and the upper portion 70 is flexible. The upper portion 70 defines an annular ring having an inner diameter approximately equal to the outer diameter of the tubing collar 34. In an alternate embodiment, a third annular sealing means (not shown) is disposed between the first annular sealing means 64 and the inward protruding annular step 30 of body 12. The third annular sealing means has a rectangular cross-section and acts as a vacuum seal. The third annular sealing means also controls extrusion of the first annular sealing means 64.

Figure 4:
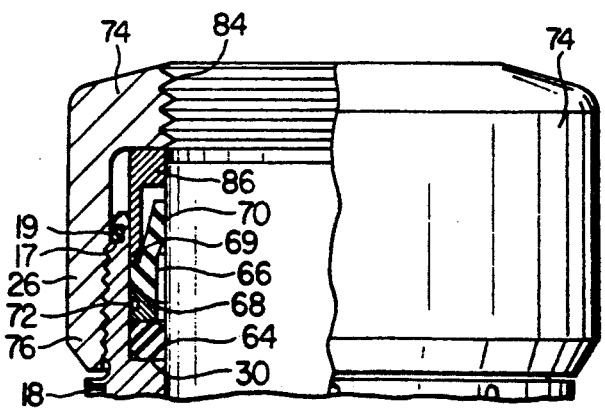
FIG. 4 is a partial view of a coupling apparatus according to the present invention.

A top cap 74 having an internally threaded lower portion 76 is threadedly engaged with the radially outer upper surface 16 of body 12. The top cap 74 also includes a radially outer upper threaded surface 78. The top cap 74, however, can have any desired profile to accommodate any oilfield tools used for pumping of fluids and passage of tools, tubing and wireline. For instance, as shown in FIG. 4, the top cap 74 of the coupling apparatus 10 has an internally threaded upper surface 84 for engagement with a cementing head (not shown). In this manner, the cementing head may be connected to the tubing 32 quickly, easily and safely.

The top cap 74 may also be modified to accommodate a frac head or to pump any fluid or lower instruments within a cylindrical member under pressure.

As shown in FIG. 4, a spacer 86, preferably, is disposed between the outward protruding annular leg 69 and the top cap 74 to centralize the second annular sealing means 66 with respect to the tubing collar 34. The spacer 86 helps to prevent the second annular sealing means 66 from being dislodged from engagement with the first annular sealing means 64 when the coupling apparatus 10 is slipped over the collar 34 of tubing 32.

In operation, the coupling device 10 is disposed about tubing 32 having a tubing collar 34. The bottom cap 36 is rotated toward the radially outer intermediate surface 18 of body 12 so that the beveled surface 42 of the inward protruding annular leg 40 of bottom cap 36 engages the beveled surface 46 of each dog 44. The rotation of the bottom cap 36 is continued until the inner surface 47 of each dog 44 contacts the radially outer surface 33 of tubing 32 and the upper surface 49 of each dog 44 contacts and engages shoulder 35 of the tubing collar 34. Preferably, when the facing surface 47 and the upper surface 49 of the dogs 44 engage both the radially outer surface 33 of tubing 32 and the shoulder 35 of tubing collar 34, the dogs 44 are in a locking position and comprise a segmented but continuous annular ring as shown in FIG. 2.

Figure 2:
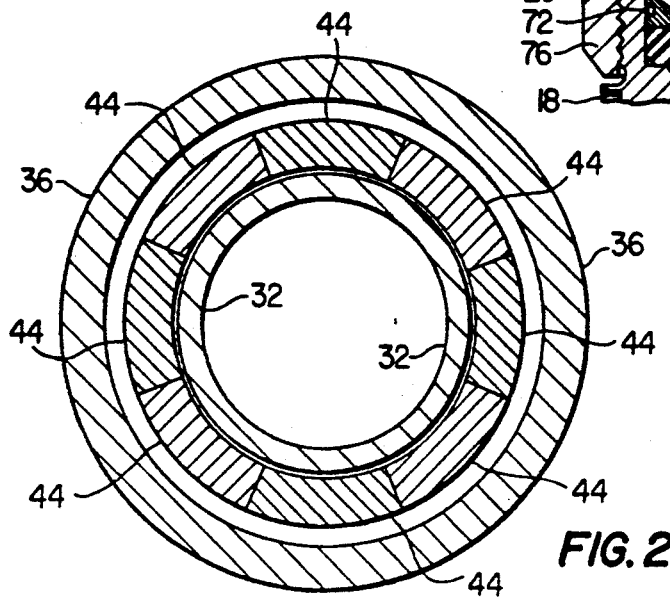
FIG. 2 is a section taken along line 2—2 of FIG. 1.

In an alternate embodiment, an O-ring (not shown) is disposed within the groove 51 of each dog 44 to urge the plurality of dogs 44 to form a segmented cylinder as shown in FIG. 2. In this manner, when the coupling apparatus 10 is disposed about tubing 32, the second beveled surface 46 of dogs 44 contacts the upper corner 37 of the tubing collar 34 urging the dogs 44 radially outward to allow the coupling apparatus 10 to pass by the collar 34. When the upper surfaces 49 of the dogs 44 clear the lower corner 39 of the tubing collar 34, the dogs 44 are urged inward by the O-ring so that the inner surfaces 47 of the dogs 44 contact the radially outer surface 33 of the tubing 32. This embodiment allows the coupling apparatus 10 to be disposed about tubing 32 with the dogs 44 in locking position over the collar 34 without any manipulation other than the lowering of the coupling apparatus 10 about the tubing 32. Thus, this embodiment is especially suitable for controlling oil or gas well blow-outs or fires. When it is desired to remove the coupling apparatus 10 from the tubing 32, however, the O-ring must be cut.

In another alternate embodiment, the dogs 44 are chamfered as shown in FIG. 5 to include a third beveled surface 53. This embodiment facilitates the passage of the dogs 44 by the lower corner 39 of the collar 34. If the top surfaces of the dogs 49 have not cleared the lower corner 39 of the collar 34, the third beveled surface 46 allows the dogs 44 to slide past the lower corner 39 of the collar 34.

In still another alternate embodiment and as shown in FIG. 5, the dogs 44 are modified to include a plurality of teeth 55 disposed on the inner surface 47. In this embodiment, the coupling apparatus 10 is disposed about tubing 32 that does not include a collar 34. When the dogs 44 are urged toward the tubing 32 the plurality of teeth 55 engage the tubing 32. When upward pressure is exerted on the coupling apparatus 10 the teeth 55 dig into the tubing 32 and prevent the coupling apparatus 10 from being disengaged from the tubing 32.

When surface pumping equipment (not shown) is attached to the radially outer upper threaded surface 78 of top cap 74 and a desired fluid is introduced within the coupling device 10, the fluid first enters passageway 80 and the predominant portion enters tubing 32. However, the fluid is typically pumped under such a high pressure that a certain amount of the fluid will enter chamber 82. In chamber 82 there must be a seal between the coupling apparatus 10 and tubing 32 to prevent blow-outs and leakage. Thus, an O-ring 19 is disposed within groove 17 to provide a seal between the body 12 and the top cap 74. Also, the fluid in chamber 82 hydraulically biases the upper portion 70 of the second annular sealing means 66 against the tubing collar 34 to provide a seal between the second annular sealing means 66 and the tubing collar 34. An O-ring (not shown) is provided in annular groove 72 in the second annular sealing means 66 to provide a seal between the second annular sealing means 66 and the body 12. At a certain pressure, the seal between second annular sealing means 66 and the tubing collar 34 will begin to leak. At this point the fluid exerts a piston-action on the outward protruding annular leg 69 of the second annular sealing means 66 to the extent that the first annular sealing means 64 is deformed to provide a seal between the tubing collar 34 and the body 12. The coupling apparatus 10 has been tested up to a pressure of 9,500 pounds per square inch and no sealing failure has been experienced.

When the circulation of the desired fluid is completed, the surface pumping equipment is removed from the radially outer upper threaded surface 78 and the coupling apparatus 10 is removed from the tubing 32 by rotating the bottom cap 36 away from the radially outer intermediate surface 18 of body 12 and the inward protruding annular leg 40 having a beveled surface 42 is moved away from the first beveled surface 45 of the plurality of dogs 44. In this manner, the dog release springs 56 urge the plurality of dogs 44 away from the radially outer lower threaded surface 20 of body 12 so that the upper surfaces 47 of the dogs 44 are released from the shoulder 35 of tubing collar 34. The coupling apparatus 10 may then be removed from tubing 32 and further drilling or pumping activities may be resumed.

In still another embodiment of the present invention, the coupling device 10 may be disposed about tubing 32 with the dogs 44 in locking position over collar 34 and used as a lifting device to lift tubing 32. In this embodiment, the first annular sealing means 64 and the second annular sealing means 66 may be eliminated.

All components of the coupling device 10 of the present invention are preferably made from high strength heat treated steel with the exception of the various O-rings, the first annular sealing means 64 and the upper portion 70 of the second annular sealing means 66 which are preferably made from oil-resistant rubber.

The coupling apparatus 10 of the present invention accommodates tubing having collars of varying sizes and can accommodate all collars that are within API tolerance and most proprietary collars. It is contemplated that the apparatus of the present invention can be modified to accommodate any size tubing with any size collar.

While the present invention has been described in detail and with reference to specific embodiments thereof, it will be apparent to one skilled in the art that various changes and modifications can be made without departing from the spirit and scope thereof.

What is claimed is:

1. A coupling apparatus for connection to a cylindrical member, comprising:
   (a) a body member having a cylindrical bore, said body member comprising a first radially outer threaded surface and a second radially outer threaded surface;
   (b) first cap means engaged with said body member at a first end thereof, said first cap means comprising an internally threaded portion engaged with said second radially outer threaded surface of said body;
   (c) second cap means engaged with said body member at a second end thereof, said second cap means comprising an internally threaded portion engaged with said first radially outer threaded surface of said body;
   (d) a plurality of locking means slidingly engaged with said body member and registering with said first cap means;
   (e) first annular sealing means disposed within said bore of said body; and
   (f) second annular sealing means disposed within said bore of said body and engaged with said first annular sealing means;
   wherein said second radially outer threaded surface of said body member comprises a radially outer ring having a plurality of slots and said locking means are slidingly engaged within said plurality of slots.

2. A coupling apparatus according to claim 1, wherein each said locking means comprises a bore and further comprising a plurality of screws threadedly engaged with said bore in each said locking means, wherein said screws register with said slots in said radially outer ring of said body.

3. A coupling apparatus according to claim 2, wherein each of said plurality of screws comprises a head having a diameter that is greater than the width of each of said plurality of slots in said radially outer ring of said body.

4. A coupling apparatus according to claim 2, further comprising a plurality of locking means springs having a first leg, a second leg and a bore disposed intermediate said first leg and said second leg, wherein each said locking means release spring rests on said radially outer ring of said body and said first leg and said second leg of each said plurality of locking means release springs are juxtaposed with said second radially outer threaded surface of said body, and wherein each of said plurality of screws passes through the bore of a corresponding one of said plurality of locking means release springs.

* * * * *

UNITED STATES PATENT AND TRADEMARK OFFICE
CERTIFICATE OF CORRECTION

PATENT NO. : 5,152,554

DATED : October 6, 1992

INVENTOR(S) : Karl K. LaFleur et al.

It is certified that error appears in the above-identified patent and that said Letters Patent is hereby corrected as shown below:

Column 6, line 58, after "means" insert -- release --.

Signed and Sealed this

Nineteenth Day of October, 1993

*Attest:*

BRUCE LEHMAN

*Attesting Officer*  *Commissioner of Patents and Trademarks*